United States Patent [19]

Lunden

[11] Patent Number: 5,786,576
[45] Date of Patent: Jul. 28, 1998

[54] SELF-STEERING SYSTEM FOR GUIDING A MOVING INDUCTION COIL DURING THERMOPLASTIC WELDING

[75] Inventor: C. David Lunden, Federal Way, Wash.

[73] Assignee: The Boeing Company, Seattle, Wash.

[21] Appl. No.: 564,566

[22] Filed: Nov. 28, 1995

Related U.S. Application Data

[60] Provisional application No. 60/007,290 Nov. 6, 1995.
[51] Int. Cl.⁶ .................................................. H05B 6/36
[52] U.S. Cl. .......................... 219/672; 219/674; 219/676; 219/677; 219/633
[58] Field of Search .................... 219/604, 633, 219/634, 645, 647, 677, 672, 673, 674, 675, 676; 156/274.2; 336/107, 176

[56] References Cited

U.S. PATENT DOCUMENTS

| | | | |
|---|---|---|---|
| 4,271,345 | 6/1981 | Palmer et al. | 219/677 |
| 4,343,209 | 8/1982 | Moelbert | 83/16 |
| 4,489,123 | 12/1984 | Schijve et al. | |
| 4,671,470 | 6/1987 | Jonas | |
| 5,039,970 | 8/1991 | Cox | 336/107 |
| 5,240,542 | 8/1993 | Miller et al. | |
| 5,248,864 | 9/1993 | Kodokian | |
| 5,444,220 | 8/1995 | Hansen et al. | 219/633 |

*Primary Examiner*—Tu B. Hoang
*Attorney, Agent, or Firm*—John C. Hammar

[57] ABSTRACT

Thermoplastic welding is an emerging technology targeted at significantly reducing the manufacturing cost of aerospace structure by eliminating fasteners and the touch labor associated with fasteners to prepare, install, and inspect the assemblies. Quality welds are highly dependent upon achieving appropriate temperatures everywhere along the bond line. The present invention is a system that uses a secondary coil to detect misalignment between the induction coil and the susceptor which would result in an excessive bond line temperature (in portions of the weld) and to provide control signals for the coil or parasitic compensation to avoid the overheating.

3 Claims, 4 Drawing Sheets

SELF-STEERING SYSTEM FOR GUIDING A MOVING INDUCTION COIL DURING THERMOPLASTIC WELDING

REFERENCE TO RELATED APPLICATIONS

This application claims the benefit of U.S. Provisional Application Ser. No. 60/007,290, filed Nov. 6, 1995.

1. Technical Field

The present invention is relates to a nonintrusive method for guiding a moving primary induction coil into alignment with an embedded susceptor along the bond line in a thermoplastic weld using a secondary sensor coil. Such steering controls the bond line heating and achieves a quality weld. Alternately, the present invention is a method and apparatus to create a compensating magnetic field and compensating hot spot on the otherwise cooler side of the susceptor using a differential parasitic secondary coil.

2. Background Art

Three major joining technologies exist for joining aerospace composite structure: mechanical fastening; adhesive bonding; and welding. Both mechanical fastening and adhesive bonding use costly, time consuming assembly steps that introduce excess cost even if the parts are fabricated from components produced by an emerging, cost efficient process. Mechanical fastening requires expensive hole locating, drilling, shimming, and fastener installation, while adhesive bonding usually requires complicated surface pretreatments.

In contrast, composite welding, which eliminates fasteners, can join thermoplastic composite components at high speeds with minimum touch labor and little, if any, pretreatments. In our experience, the welding interlayer, called a susceptor, also can simultaneously take the place of shims required in mechanical fastening. As such, composite welding holds promise to be an affordable joining process. For "welding" thermoplastic and thermoset composite parts together, the resin that the susceptor melts functions as a hot melt adhesive. If fully realized, the thermoplastic-thermoset bonding will further reduce the cost of composite assembly.

Thermoplastic welding is a process for forming a fusion bond between two faying thermoplastic faces of two parts. A fusion bond is created when the thermoplastic on the surface of the two parts is heated to the melting or softening point and the two surfaces are brought into contact, so that the molten thermoplastic mixes, and, then, the surfaces are held in contact while the thermoplastic cools below the softening temperature.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

The exponential decay of the strength of magnetic fields with distance from their source dictates that, in induction welding processes, the structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some cases, destruction or denaturing of the resin. To avoid overheating of the outer plies and to insure adequate heating of the inner plies, a susceptor of significantly higher conductivity than the fibers is used to peak the heating selectively at the bond line of the plies when heating from one side. An electromagnetic induction coil on one side of the assembly heats a susceptor to melt and cure a thermoplastic resin (also sometimes referred to as an adhesive) to bond the elements of the assembly together. Often the current density in the susceptor is higher at the edges of the susceptor than in the center because of the nonlinearity of the coil. This problem typically occurs when using a cup core induction coil like that described in U.S. Pat. No. 5,313,037 and can result in overheating the edges of the assembly or underheating the center, either condition leading to inferior welds because of non-uniform curing. It is necessary to have an open or mesh pattern in the susceptor to allow the resin to bond between the composite elements of the assembly when the resin heats and melts. Misalignment can also result in temperature variations, producing excessive heating in isolated locations because of the induction physics. The present invention is one mechanism for achieving proper alignment between the moving induction coil and the susceptor to reduce problems associated with excessive heating. The guiding system is especially adapted for use with the cup coil of U.S. Pat. No. 5,313,037.

U.S. Pat. No. 4,673,450 describes a method to spot weld graphite fiber reinforced PEEK composites using a pair of electrodes After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly is required in this process which limits its application.

Prior art disclosing thermoplastic welding with induction heating is illustrated by U.S. Pat. Nos. 3,966,402 and 4,120,712. In these patents, the metallic susceptors used are of a conventional type having a regular pattern of openings of traditional manufacture. Achieving a uniform, controllable temperature in the bond line, which is crucial to preparing a thermoplastic weld of adequate integrity to permit use of welding in aerospace primary structure, is difficult with those conventional susceptors, as we discussed and illustrated in U.S. Pat. No. 5,500,511.

Simple as the thermoplastic welding process sounds, and easy as it is to perform in the laboratory on small pieces, it becomes difficult to perform reliably and repeatably in a real factory on full-scale parts to build a large structure such as an airplane wing box. The difficulty is in getting the proper amount of heat to the bond line without overheating the entire structure, and also in achieving intimate contact of the faying surfaces of the two parts at the bond line during heating and cooling despite the normal imperfections in the flatness of composite parts, thermal expansion of the thermoplastic during heating to the softening or melting temperature, flow of the thermoplastic out of the bond line under pressure, and then contraction of the thermoplastic in the bond line during cooling.

a. Moving coil welding processes

In U.S. Pat. No. 5,500,511, we described a tailored susceptor for approaching the desired temperature uniformity. This susceptor relied upon carefully controlling the geometry of openings in the susceptor (both their orientation and their spacing) to distribute the heat evenly. For example, we suggested using a regular array of anisotropic, diamond shaped openings with a ratio of the length (L) to the width (W) greater than 1 to provide a superior weld over that achieved using a susceptor having a similar array, but one where the L/W ratio was one. By changing the length to width ratio (the aspect ratio) of the diamond-shaped openings in the susceptor, we achieved a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, we altered the current density in regions near the edges by increasing the foil density (i.e., the absolute amount of metal). Increasing the foil density along the edge of the susceptor increases the conductivity along the edge and reduces the current density and the edge heating. We increased foil density by folding the susceptor to form edge strips of double thickness or by compressing openings near the edge of an otherwise uniform susceptor. We found this susceptor difficult to reproduce reliably. Also, its use forced careful placement and alignment to achieve the desired effect when using the cup coil of U.S. Pat. No. 5,313,037 and the multipass welding process of U.S. Pat. No. 5,486,684, both of which we incorporate by reference.

With the cup coil, the magnetic field is strongest near the edges because the central pole creates a null at the center. Therefore, the susceptor is designed to counter the higher field at the edges by accommodating the naturally higher induced current near the edges. The high longitudinal conductivity encourages induced currents to flow longitudinally. In the present invention, we capitalize on the nature of the magnetic field and its interaction with the susceptor to obtain guiding signals to maintain proper alignment between the coil and the susceptor.

With our tailored susceptor or with other moving coil welding operations, achieving the proper bond line temperature requires empirical design calibration. Even then, the bond line temperature may fluctuate within a relatively wide range because of misalignment, variations in the susceptor, variations in the geometry (such as skin plies or spar curvature), or variations in coil speed or coil power. We have created calibration curves (i.e., allowables data) for a specified power at a specified head speed, geometry, and material system. The allowables data must be quite extensive, and there is still no assurance that an actual run is producing a weld that corresponds to the test data. Therefore, monitoring the bond line temperature in real time takes on greater significance to achieving process control and quality welds.

We described a selvaged susceptor for thermoplastic welding in U.S. Pat. No. 5,508,496. That selvaged susceptor controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil of U.S. Pat. No. 5,444,220, because that coil, provides a controllable area of intense, uniform heating, under the poles a trailing region with essentially no heating, and a leading region with minor preheating. We also incorporate this patent and application by reference.

We achieve better performance (i.e., more uniform heating) in rib welding by using a selvaged susceptor having a center portion with a regular pattern of openings and solid foil edges, which we refer to as selvage edge strips. We embed the susceptor in a thermoplastic resin to make a susceptor/resin tape that is easy to handle and to use in assembling the composite pieces prior to welding. Also, we have discovered that, with a selvaged susceptor, the impedance of the central portion should be anisotropic with a lower transverse impedance than the longitudinal impedance. Here, the L/W ratio of diamond shaped openings should be less than or equal to one. That is, unlike our tailored susceptor of U.S. Pat. No. 5,500,511, L for the selvaged susceptor of U.S. Pat. No. 5,508,496 should be less than W. With this new selvaged susceptor in the region immediately under the asymmetric induction work coil described in U.S. Pat. No. 5,444,220, we encourage the current to flow across the susceptor to the edges where the current density is lowest and the conductivity, highest.

Generally, we form the selvaged susceptor somewhat wider than the bond line so that the selvage edge strips extend on either side of the bond line. We remove the selvage edge strips after forming the weld, leaving only a perforated susceptor foil in the weld. This foil has a relatively high open area fraction.

A structural susceptor allows us to include fiber reinforcement within the weld resin to alleviate residual tensile strain otherwise present in an unreinforced weld. The susceptor includes alternating layers of thin film thermoplastic resin sheets and fiber reinforcement (usually woven fiberglass fiber) sandwiching the conventional metal susceptor that is embedded in the resin. While the number of total plies in this structural susceptor is usually not critical, we prefer to use at least two plies of fiber reinforcement on each side of the susceptor.

The structural susceptor permits gap filling between the welded composite laminates which tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which is too wide to create a quality weld using the conventional susceptors.

We can easily tailor the thickness of the structural susceptor to match the measured gap by scoring through the appropriate number of plies of resin and fiber reinforcement and peeling them off. In doing so, a resin rich layer will be on both faying surfaces and this layer should insure better performance from the weld.

The need for a susceptor in the bond line poses many obstacles to the preparation of quality parts. The metal which is used because of its high susceptibility differs markedly in physical properties from the resin or fiber reinforcement, so dealing with it becomes a significant issue. A reinforced susceptor overcomes problems with conventional susceptors by including delicate metal foils (0.10–0.20 inch wide ×0.005–0.010 inch thick; preferably 0.10×0.007 inch) in tandem with the warp fibers of the woven reinforcement fabric. The foil is always on the remote side of the fabric because it is between the warp thread and the weave threads. This arrangement holds the foils in place longitudinally in the fabric in electrical isolation from each other, yet substantially covering the entire width of the weld surface. This arrangement still allows adequate space for the flow and fusion of the thermoplastic resin. Furthermore, in the bond line, the resin can contact, wet, and bond with the reinforcing fiber rather than being presented with the resin-philic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement the foil can assume readily the contour of the reinforcement. Finally, the arrangement permits efficient heat transfer from the foil to the resin in the spatial region where the bond will form.

Our earlier susceptors were essentially planar (X-Y) structures or laminates of planar films. Welds that embed these susceptors lack reinforcement in the Z-plane, but welds can include such reinforcement (with corresponding improvement in the pulloff strength) if they incorporate a barbed susceptor. A barbed susceptor typically uses a Fe—Ni alloy susceptor that is formed to include barbed, Z-pin reinforcement to provide improved pulloff strength. The alloy chosen for this susceptor has a coefficient of thermal expansion(CTE) that essentially matches the CTE of the composite and a Curie temperature of about 700° F. (370° C.), which is essentially ideal for thermoplastic welding of resins like K3A polyimide. For this application, an alloy of 42% Ni –58% Fe including γ strengthening elements of Al, Ti and Cb yields both low CTE and high strength. The susceptor is preferably made by laser cutting a foil of the material to form barbed tabs and pushing the cut tabs alternately up and down to give the susceptor a three dimensional character. Alternatively a woven wire mesh may be used in this application with alternating wires ending in the Z direction. The thermoplastic resin cures or consolidates around the barbs during the welding process which provides the pulloff strength improvement Welding researchers expended significant effort in developing inductor and susceptor systems to optimize the heating of the bond line in the welded thermoplastic assemblies. Another hurdle remaining to perfect the welding process to the point of practical utility for producing large scale aerospace-quality structures in a production environment is the aspect of the process dealing with the control of the surface contact of the faying surfaces. This aspect of thermoplastic welding controls the timing, intensity, and schedule of heat application so the material at the faying surfaces is brought to and maintained within the proper temperature range for the requisite amount of time for an adequate bond to form. Then, intimate contact is maintained while the melted or softened material hardens in its bonded condition.

Large scale parts such as wing spars and ribs, and the wing skins that are bonded to the spars and ribs, are typically on the order of 20–30 feet long at present, and potentially, can be several hundred feet in length when the process is perfected for commercial transport aircraft. Parts of this magnitude are difficult to produce with perfect flatness. Instead, the typical part will have various combinations of surface deviations from perfect flatness, including large scale waviness in the direction of the major length dimension, twist about the longitudinal axis, dishing or sagging of "T" beam flanges, and small scale surface defects such as asperities and depressions. These irregularities interfere with full surface area contact between the faying surfaces of the two parts and can result in surface contact only at a few "high points" across the intended bond line. Additional surface contact can be achieved by applying pressure to the parts to force the faying surfaces into contact, but full intimate contact is difficult or impossible to achieve in this way. Applying heat to the interface by electrically heating the susceptor in connection with pressure on the parts flattens the irregularities when the resin melts. Additional time is needed after flattening to achieve full intimate contact. Extended use of heat and pressure may be excessive, however, and may result in deformation of the top part. When the overall temperature of the "T" beam flange is raised to the softening point, it will begin to yield or sag under the application of the pressure needed to achieve a good bond. If sagging occurs the necessary pressure will be lost and so will the final product configuration.

Our multipass thermoplastic welding process described in U.S. Pat. No. 5,486,684 enables a moving coil welding process to produce continuous or nearly continuous fusion bonds over the full area of the bond line to yield high strength welds reliably, repeatably, and with consistent quality. This process produces improved low cost, high strength composite assemblies of large scale parts, fusion bonded together with consistent quality. It uses a schedule of heat application that melts the resin at the faying surfaces yet maintains the overall temperature of the structure within the limit in which it retains its high strength. It avoids sagging and, so, does not require internal tooling to support the structure against sagging which otherwise could occur above the high strength temperature limit. The process also produces nearly complete bond line area fusion on standard production composite material parts having the usual surface imperfections and deviations from perfect flatness. The welding process eliminates fasteners and the expense of drilling holes, inspecting the holes and the fasteners, inspecting the fasteners after installation, sealing between the parts and around the fastener and the holes; reducing mismatch of materials; and arcing from the fasteners.

In the process, an induction coil is passed multiple times over a bond line while applying pressure at least in the region of the coil to the assembled components to be welded and maintaining the pressure until the resin hardens. The resin at the bond line is heated to the softening or melting temperature with each pass of the induction coil and pressure is exerted to flow the softened/melted resin in the bond line and to reduce the thickness of the bond line while improving the intimacy of the faying surface contact with each pass. Multiple passes then complete the continuity of the bond. The total time at the softened or melted condition of the thermoplastic in the faying surfaces is sufficient to attain deep inter diffusion of the polymer chains in the materials of the two faying surfaces throughout the entire length and area of the bond line. Doing so, produces a bond line of improved strength and integrity in the completed part. Because the total time of the faying surfaces at its softening temperature is separated into several segments, heat in the interface dissipates between passes so that each subsequent pass reheats the resin at the faying surfaces but does not raise the temperature of the entire structure to the degree at which it loses its strength and begins to sag. The desired shape and size of the final assembly is maintained.

Another moving coil welding operation seeks to apply a substantially constant and uniform pressure on the entire bond line throughout the welding operation. As described in U.S. patent application Ser. No. 08/367,557, such a welding operation, which we call "fluid tooling," includes an elongated vessel made of fluid impervious flexible material. The vessel has an elongated axis and an open end at each axial end of the vessel, and has a cross sectional dimension sized to accommodate the coil. Each axial end of the vessel is closed and sealed by an end closure. At least one of the end closures is removable for insertion of the coil into the vessel. A linear guide in the vessel extends axially for substantially the full length of the vessel and guides the coil for movement axially through the vessel. Power leads are connected to the coil and extend through a pass-through in one end closure to connect the coil to a source of high frequency electrical power to energize the coil to produce an alternating magnetic field. A motive system is provided for moving the coil axially along the vessel over the bond line at a controlled speed. The motive system generally includes a pair of magnets guided along opposite sides of the vessel and magnetically coupled to a ferromagnetic mass connected to the coil. The magnets are moved along their guides and pull the coil attached to the ferromagnetic mass inside the vessel. A backup structure exerts a downward force along the top of the vessel, pressurizing fluid sealed in the vessel and distributing the pressure uniformly over the top surface of the top part to press the top part against the bottom part and facilitate fusion bonding of the thermoplastic in the faying surfaces of the interface.

b. Fixed coil induction welding

We have also experimented with thermoplastic welding using our induction heating workcell and, of course, discovered that the process differs from the moving coil processes because of the coil design and resulting magnetic field. Our present invention, however, does not apply to this fixed coil process. We believe that our fixed coil workcell presents promise for welding at faster cycle times than the moving coil processes because we can heat multiple susceptors simultaneously. We can reduce operations where the moving coil takes hours to minutes in the fixed coil. The keys to the process, however, are achieving controllable temperatures at the bond line in a reliable and reproducible process that assures quality welds of high bond strength. Our fixed coil induces currents to flow in the susceptor differently from the moving coils and covers a larger area. Nevertheless, we have developed processing parameters that permit welding with our induction heating workcell using a susceptor at the bond line. The fixed coil process is described in greater detail in U.S. Pat. No. 5,624,134.

Another advantage with the fixed coil process is that welding can occur using the same tooling and processing equipment that we use to consolidate the skin, thereby greatly reducing tooling costs. Finally, the fixed coil heats the entire bond line at one time to eliminate the need for shims that are currently used with the moving coil. We can control the temperature and protect against overheating by using our "smart" susceptors as a retort or as the bond line susceptor material or both.

c. Temperature monitoring

In copending U.S. patent application Ser. No. 08/548,823 entitled "Monitoring the Bond Line Temperature in Thermoplastic Welds," we describe a system for thermoplastic welding to monitor the bond line temperature in real time allowing detection of the onset of flow of the thermoplastic resin. The system permits guidance control of the induction head to adjust its power, speed, or motion in response to the measured temperature. Basically, we embed at least one multinode thermocouple within the weld near the bond line in a layer adjacent the susceptor to measure the temperature under the moving coil.

The thermocouple is made by twisting the wires together or in a zig-zag fashion to form periodic nodes along the bond line. A single wire thermocouple configuration using constantan wire and using the copper susceptor as the second conductor also possible. The spacing of the nodes depend on the desired resolution, but, should be about 0.2 inch or so apart.

The thermocouple will be an open circuit prior to the onset of thermoplastic flow, and will not have a voltage output. At the onset of flow, the two thermocouple wires short and produce a thermoelectric voltage proportional to the temperature of the thermocouple junction. The thermocouple will read the temperature directly under the induction head, that being the hottest junction and also the one that is closest to the monitor input. The multinode thermocouple behaves like a series of parallel batteries. The node closest to the monitor produce the highest voltage amplitude because it directly in the hot zone. The same node also acts as a short to any other voltages produced by thermocouple nodes further away from the monitor. Each consecutive junction shorts the potential generated by the preceding node. If the node contact resistance is high there may be a small error.

In U.S. Pat. No. 5,573,613, we described a method for determining the susceptor temperature by measuring the change in impedance of the induction coil. As the susceptor heats, its electrical resistance changes as a function of the thermal coefficient of resistance (TCR) of the susceptor material, and that change is reflected back as a change in the drive coil impedance. An electrical circuit senses the varying impedance/resistance and converts that change into a change of temperature on a temperature display, or into a signal to adjust the power to the coil or the speed of travel of the coil along the bond line. The sensing circuit includes a high power bridge with a sensitive null arm to sense changes in the susceptor impedance due to temperature changes.

A simple L-R bridge detects the changing resistance of the susceptor as its temperature changes during inductive heating. The bridge includes a high-power transformer of about 500 watts operating at about 35–55 kHz connected across a pair of series-connected inductors $L_1$ and $L_2$ and a pair of series-connected resistors $R_1$ and $R_2$. Both series-connected pairs are connected to each other in parallel and in parallel with the transformer. A shunt with a voltage sensor (such as a voltmeter or an oscilloscope) is connected between the two resistors and the two inductors. The two sides of the bridge are asymmetric by at least 2:1 to put most of the power in the bond line for the sake of efficiency, since power dissipated in the reference side of the bridge is wasted. The two coils $L_1$ and $L_2$ are designed to track fairly closely so that their inductances and Q's (i.e. the dimensionless power ratio of stored to dissipated power) vary consistently with frequency. One of inductors $L_1$ or $L_2$ is the moving coil to transfer energy to the susceptor.

The bridge signal produced by the is used to control the welding process interactively by adjusting the power to the coil in a closed loop RF heating control circuit, or by adjusting the speed of travel of the coil over the bond line, or both, so as to maintain the melt pool temperature within the desired range of optimum processing temperature, that is, 620±25° F. in the case of the Avamid K3B polyimide. The signal is conditioned in a suitable conditioning circuit, which would depend on the voltage sensor used and could produce a digital signal to the power amplifier to turn the amplifier up or down, in the nature of a thermostat control, whenever the melt pool temperature drops below or exceeds the optimal temperature range. Preferably, the signal conditioner circuit produces a signal proportional to the voltage sensor signal to adjust the power to the work coil up or down from a predetermined average power level known to maintain a steady state temperature in the melt pool at the coil speed used. Nevertheless, overheating can still be a significant problem, especially localized if overheating arises form misalignment between the moving coil and the susceptor. Therefore, in the present invention, we describe a self-steering system for dealing with misalignment so as to avoid deleterious overheating.

The present invention is a nonintrusive system associated with a moving induction coil, particularly one of the type described in U.S. Pat. No. 5,313,037, for self-steering the coil over the susceptor to avoid excessive, damaging overheating that otherwise might occur because of misalignment between the coil and the susceptor. Alternately, the system can sense the misalignment by the aberration in the magnetic field and can create a compensating "hot spot" with a differential, parasitic, secondary coil.

SUMMARY OF THE INVENTION

In the present invention, when there is a misalignment between the primary coil of the induction head and the susceptor, the self-steering system produces a guiding command with a secondary coil to return the primary coil to the centerline. Alternately, the system can use a differential, parasitic secondary coil to compensate for the misalignment and to achieve better temperature uniformity in the bond line by adjusting the magnetic field. To accomplish these features, we use two, peripheral, coils that we connect in differential mode to produce a null (i.e., no differential voltage) when the coil is centered over the susceptor. Doing so, we tip the coils at 45° on the sides of the cup coil of U.S. Pat. No. 5,313,037.

A compensating secondary coil can be located in the centerline of the drive coil. This secondary coil has a "lazy 8" design and produces no measurable effect when inserted between the primary coil and the parts assembled for welding, unless the coil and susceptor are misaligned. When there is misalignment, the "lazy 8" forms a compensatory "hot spot" on the side of the susceptor that would otherwise be cool because of the misalignment. Compensation occurs provided that the "lazy 8" has a total resistance lower than the eddy, but the effect does not fully compensate for the offset.

DETAILED DESCRIPTION OF THE PREFERRED EMBODIMENT

First, we will describe a typical thermoplastic welding operation and then will describe our self-steering system using a nonintrusive secondary coil for producing quality welds by avoiding or compensating localized overheating due to misalignment.

For purposes of this description, "laminates" means a fiber-reinforced organic resin matrix composite having a plurality of plies of prepreg or its equivalent consolidated together and cured, as appropriate. The laminates are prefabricated by any appropriate means including automatic or hand tape or tow fiber placement with autoclave consolidation and cure, resin transfer molding (RTM), or the like. Generally, the organic matrix resin is a thermoplastic, especially PEK, PEEK, PEKK, ULTEM polyimide, or K3. In the welding operation, resin in the laminates as well as resin in the susceptor melts, intermixes, and fuses to form the weld. The laminate might also be a thermoset in which case the welding process actually forms a hot melt adhesive bond rather than a weld. We prefer welding, but recognize the analogous process of adhesive bonding of thermosets.

In a thermoplastic laminate, the reinforcing fiber typically is carbon fiber in continuous or chopped form, and generally as tow or woven fabric. While other fibers can be used, modern aerospace requirements most often dictate carbon fibers for their strength and durability, and we prefer them. In thermosets, especially epoxy, the fibers might be graphite.

1. A Moving Coil Welding Operation

Figure 1:
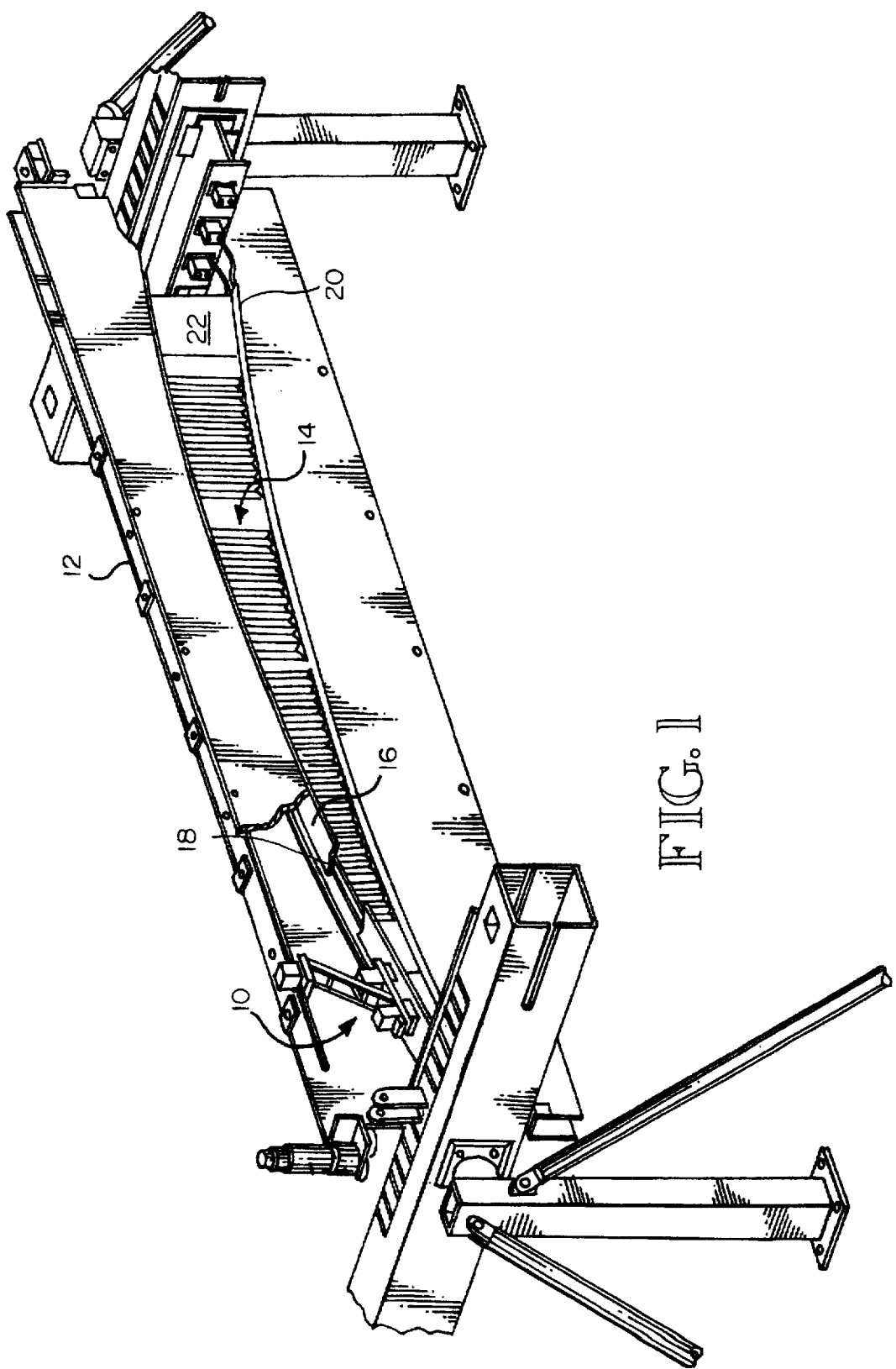
FIG. 1 is a perspective view of a moving coil thermoplastic welding apparatus.

Turning now to FIG. 1, a thermoplastic welding head 10 that includes leading and trailing pneumatic pressure pads and a primary induction coil 25 disposed between the pads is supported on tooling headers 12 over thermoplastic composite parts to be fusion bonded together. The parts, in this example, include a thermoplastic spar 14 and a thermoplastic wing skin 16, only a small section of which is shown in FIG. 1. The spar 14 is in the form of an "I" beam having a top cap 18, a bottom cap 20, and a connecting web 22. The spar 14 extends lengthwise of the wing of the airplane for which the parts are being assembled, and the wing skin is bonded over the full length and surface area of the spar cap 18 with sufficient strength to resist the tensile and peeling forces the wing will experience in flight. The apparatus shown is more fully described in U.S. Pat. No. 5,660,669, which we incorporate by reference. The beams might be all composite construction or a hybrid metal webbed composite capped beam as described in U.S. Pat. No. 5,668,426, which we incorporate by reference. We could also join thermoset skins and spars with a hot melt thermoplastic adhesive.

A susceptor (i.e., a metal foil susceptible to induction heating encapsulated in a thermoplastic resin) 32 (FIG. 2) is inserted between the spar cap 18 and the wing skin 16. Typically the resin is the same or a slightly lower melting temperature formulation of the same thermoplastic resin of the spar cap 18 and the lower faying surface of the wing skin 16.

Figure 2:
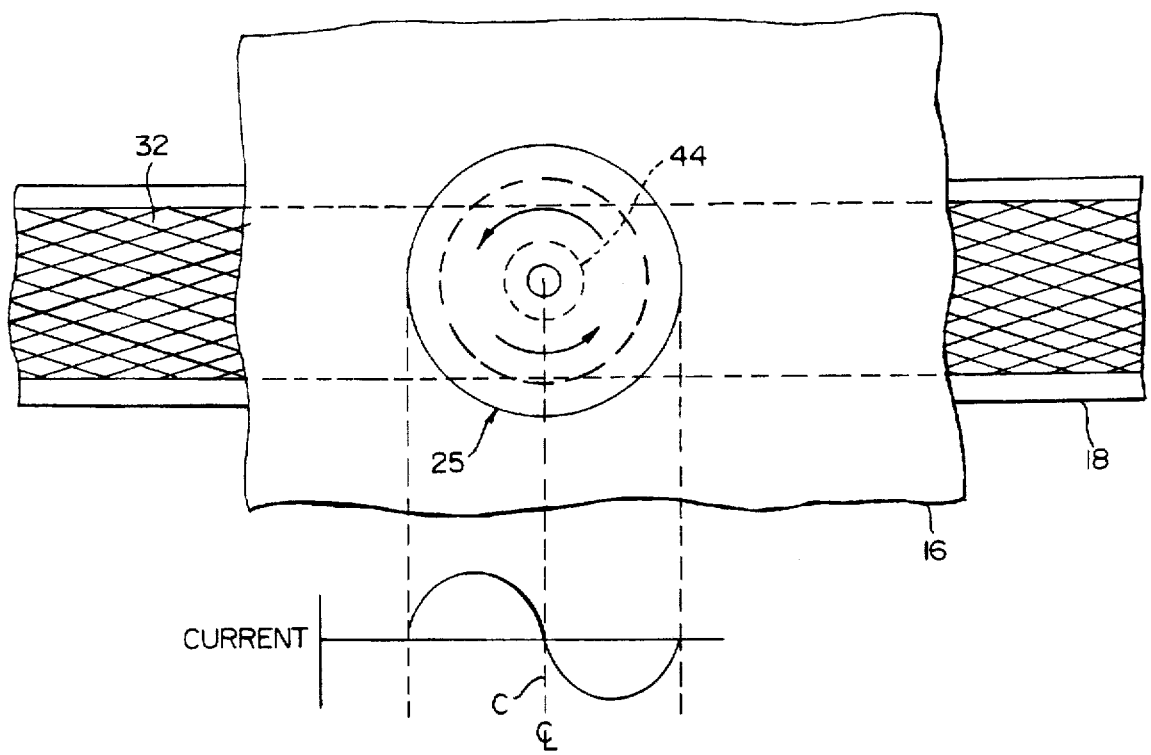
FIG. 2 is a schematic plan view, partially in section, illustrating the alignment of a cup coil with a susceptor, and further illustrating the typical current pattern that the coil induces in the susceptor

The welding head 10 can be any moving coil apparatus that is capable of applying pressure during induction heating of the bond line to promote fusion and after heating for a period sufficient for the resin to cool and harden in its bonded condition. One suitable welding head is disclosed in U.S. Pat. No. 5,635,094, which we also incorporate by reference. A preferred welding apparatus includes an induction coil 25 for inducing eddy currents in the susceptor 32. The eddy currents heat the susceptor by electrical resistance heating and soften or melt the thermoplastic resin in the faying surfaces of the parts so it flows, interdiffuses, and fuses together with softened resin of the wing skin and spar cap upon cooling. Two suitable induction coils are described U.S. Pat. Nos. 5,444,220 and 5,313,037, which we incorporate by reference. The coil shown in the '037 patent provides zero eddy current at the center with the current density increasing toward the edges, as shown in FIG. 2. For clarity and simplicity, our drawings illustrate only U.S. Pat. No. 5,313,037, but other coils could be used. Use of a tailored susceptor is desirable to counterbalance the nonuniform eddy current density that the coil produces from centerline to edge to achieve uniform heating, and such a susceptor is disclosed in U.S. Pat. No. 5,500,511. A selvaged susceptor designed especially for use with the asymmetric induction coil of U.S. Pat. No. 5,444,220 is described in U.S. Pat. No. 5,508,496.

The primary induction coil 25 is mounted in the welding head 10 in the center of a lower frame which is pinned to a link connecting the lower frame to an upper frame. The upper frame is pulled by a motive apparatus including a stepper motor driving a drive sprocket and a chain loop through a reduction gear unit. A pair of camroll bearings projects from both sides of the lower frame into cam grooves milled into the inside surfaces of the headers to guide and support the lower frame. A similar set of camroll bearings projects outward from the upper frame into a straight cam groove to guide the upper frame as it is pulled by the chain loop from one end of the wing skin to the other.

The process of welding the wing skin to the spar cap begins with assembling the parts together with the susceptor 32 interposed between the faying surfaces of the parts. In the case of a wing box, we attach the susceptor 32 to the outer surfaces of the spar caps 18 and 20 and then sandwich the spars between the upper and lower wing skins 16. The parts are held in position and squeezed together by a force exerted by a pair of air bearing pads to which air under pressure is delivered by way of air lines and distributed to the air bearing pressure pads by separate air lines. The air to the pads reduces the frictional drag on the pressure pads on the top surface of the wing skin and helps to cool the parts after the coil has passed. We move the induction coil 25 along the intended bond line over the outer surface of the wing skin in general alignment (±0.125 in) with the susceptors while producing an alternating magnetic field which projects through the wing skins and around the susceptor, generating eddy currents in the susceptor. The eddy currents induced by the magnetic field are of sufficient amperage to heat the susceptor, raising the temperature of the thermoplastic material in the faying surfaces to its softening or melting temperature. After the first pass of the welding head over each bond line to seal the box, the process is repeated three or more times, usually increasing the power to the coil after the second pass and, if desired, increasing the pressure exerted by air cylinders on the pressure pads.

The bond strength improves with repetitions of the welding passes of the welding head over the same bond line. Multiple passes of the induction coil serves to create the optimal conditions for achieving a fusion bond with the desired characteristics of continuity over the entire bond line, and substantial molecular inter diffusion of the materials in the faying surfaces to produce a bond line of high pulloff strength with the complete or nearly complete absence of voids. As discussed in U.S. patent application Ser. No. 5,486,684. We gain higher pulloff strengths using a barbed susceptor of U.S. patent application Ser. No. 08/486,560 on the bond line.

The mechanisms for achieving a fusion bond include intimate contact and "healing." Intimate contact of the two faying surfaces is a function of force exerted on the parts to squeeze them together, and temperature-dependent viscosity. The force exerted on the parts is distributed over a certain surface area as interfacial pressure tending to bring the faying surfaces together, and the viscosity of the surface material is manifested by the tendency of high spots in the surface to yield of flow so that low spots in the two surfaces can come together. "Healing" is partly a process in which molten or softened materials flow together and blend where they come into contact, and partly a process of molecular penetration of the polymer chains in the material of one surface into the molecular matrix of the material in the other faying surface. The average penetration distance of the polymer chains, without the beneficial mixing effect achieved by flowing the materials in the faying surfaces, increases as a quarter power of time (i.e., $t^{0.25}$).

Objective and easily made observations of a bond line that are indicative of the quality of the bond are reduction in bond line thickness, improved ratio of bonded to unbonded surface area in the bond line (or expressed conversely, a reduction of the amount of unbonded surface area in the bond line), and improved pass-through of a bonding resin through openings in the susceptor. We can easily measure these factors by examining the welded part and then pull testing short sections to destruction, which also provides direct bond strength data.

Irregularities such as hollows, depressions and asperities (i.e., peaks) in the faying surfaces of the parts, and other deviations from perfect flatness can interfere with and prevent continuous intimate contact along the full surfaces of the parts where bonding is intended. These deviations from perfect flatness include small scale surface features such as asperities, depressions or hollows, scratches and bumps, and also large scale features such as waviness in the direction of the major length dimension, twist about the longitudinal axis, dishing or sagging of "T" beam flanges, and warping such as humping or bowing in the longitudinal direction. The structural susceptor is particularly suited for dealing with these problems.

2. Typical Susceptors

Our susceptor might be "tailored," "selvaged," "structural" or "reinforced" as those terms are defined in our earlier patent applications. If "reinforced" so that the foil strips run in tandem with warp fibers or warp tows, barb tabs only extend outwardly in the direction opposite the carbon fiber. Otherwise, the barbs would tend to prop the foil away from the fiber.

A barbed susceptor of usually is fabricated from an age-hardened Invar foil having a thickness of from 0.003–0.010 in (0.075–0.25 mm). Other materials having good electrical conductivity and high magnetic permeability (so that it is a good susceptor) may be used. Our susceptor 100 (FIG. 2) has a pattern of openings made by forming barbs in the Z-axis by folding prongs out of the X-Y plane. The result is a susceptor that resembles barbed wire. Each prong of the susceptor might also be barbed like a fishhook. Such barbs are readily formed simply by scoring the prong with a cut that starts relatively closer to the body of the susceptor and extends into the prong at an angle running from the surface toward the tip. This susceptor is "smart" because it is made from Invar and helps to avoid excessive heating.

The barbed susceptor may also have a pattern of openings in the X-Y plane with uniform line widths of about 7 mils (0.18 mm) to define the peripheries of the diamond, as our other susceptors do, so that a fusion bond can occur through the susceptor. Of course, the openings can have shapes other than diamonds. The diamonds are easy to form by etching, stamping, or expanding and provide a convenient mechanism to control the longitudinal and transverse impedance, as we described in our other patent applications. The diamonds can have L/W ratios less than or equal to 1.0 in our selvaged susceptor where we are interested in influencing the eddy currents to run transversely into the solid edge strips. Other shapes can be used for the openings to create a foil that has a uniform impedance or whatever desired ratio in the longitudinal and transverse directions.

The barbed susceptor might be a "reinforced" multistrip susceptor with the strips being periodically cut to create Z-plane barbs. This multistrip concept is what we prefer because it is the easiest to manufacture. Such a susceptor may actually be best suited for resistance welding or heating in our induction solenoid coil heating workcell for which we have numerous applications pending, because these two processes induce currents that run longitudinally through the susceptor. The multistrip susceptor has low longitudinal impedance.

Our goal is to produce aircraft structure that eliminates fasteners. Welded structure will be far less expensive because welding eliminates the labor to drill holes accurately and to inspect the fasteners after installation. We also will avoid other problems that fasteners introduce, such as sealing around the fastener and the holes, mismatch of materials, and arcing from the fasteners. To replace the fasteners, however, requires confidence that the welds are uniform and consistent, because a failure at any weak point in the weld could lead to catastrophic unzipping of the entire welded structure. The present invention provides improved pulloff strength. One of the most important problems with quality welding is temperature uniformity along the bond line to achieve uniform and complete melt and cure of the resin. Being a "smart" susceptor, our barbed susceptor has a Curie temperature slightly higher than the welding temperature (i.e., about 700° F.) so the possibility of disastrous overheating is reduced.

We embed the foil in the resin to simplify the welding process. Making a foil/resin tape eliminates the steps of applying separate layers of resin between the respective elements in a composite-susceptor-composite assembly. It also ensures that there will always be adequate resin proximate the susceptor and essentially uniform resin thickness across the welding bond line. Our typical tape is about 2 inches wide with K3A Avimid resin (an aromatic polyimide), although we can use PEEK, PEKK, PES, PEK, ULTEM, or any other thermoplastic. The resin must be compatible with the matrix resin in the composite and generally is the same resin as the matrix resin when welding thermoplastic composites. For welding thermoset composites, the resin will likely be a comparable thermoplastic formulation of the matrix resin in the composites or a compatible resin.

To form a structural susceptor, we can take a barbed susceptor and loosely bond reinforcing fiber and thermoplastic films in alternating layers symmetrically on both sides. The fiberglass reinforcement prevents the resin from fracture under the residual strain left after welding. Higher ductility resins such as PEEK, PEK and ULTEM polyimide also resist fracture better than some thermoplastics. The thermoplastic films are preferably the same resin as that used to embed the metal foil and to fabricate the laminates. Sheet thicknesses for these films are usually about 0.001–0.002 in (0.025–0.050 mm). The woven fibers are preferably oriented perpendicular and parallel to the longitudinal axis of the weld.

The structural susceptor is generally loosely bonded together by heat or pressure or both, but could be of essentially unitary construction if desired. Being loosely bonded helps in gap filling. We use at least two layers of fiber and thermoplastic on each side of the susceptor, but the absolute number is not critical. We have tested four different styles of fiberglass and achieved similar results with each, so we do not believe that the type or style of fiberglass is critical. We have tested four different styles of fiberglass and achieved similar results with each, so we do not believe that the type or style of fiberglass is critical.

The fiber suppresses cracking if the fiber volume is at least about 30%. The thermoplastic ensures a resin rich weld. "Smart" susceptors are described in greater detail in U.S. Pat. No. 5,645,744 . "Smart" susceptors are magnetic alloys that have high magnetic permeabilities but that also have their magnetic permeabilities fall to unity at their Curie temperature. At the Curie temperature, then, the susceptors become inefficient heaters. The alloys are selected to have Curie points close to the process temperature of welding and have low thermal expansion coefficients to match composites. The preferable alloys for this application are in a composition range of from 36% Ni to 44% Ni in Fe. Additional alloying elements such as Al, Cb and Ti allow these low expansion iron-nickel alloys to be age hardened and add to the cap/skin pulloff strength.

3. Temperature Monitoring

As described in our copending U.S. patent application Ser. No. 08/548,823 entitled "Monitoring the Bond Line Temperature in Thermoplastic Welds," we welded a test panel with a sliding junction (multinode) thermocouple in the bond line. The thermocouple was made with two bare Chromel/aluminel, AWG #36 wires and wound in a zig-zag way on a piece of thermoplastic resin or was encapsulated with the resin. The thermocouple was located half way between the center of the bond line and the edge. We also welded a second test panel with two multinode thermocouples near edges of the susceptor in the bond line. The thermocouples were located half way between the center and the edge on each side of the bond line, with nodes spaced one inch apart. The output of the two thermocouples tracked within 25 degrees F.

By locating the thermocouples on the outer edges of the bond line, we can use the voltages generated by the two thermocouples as a guidance control function combining the two thermnocouple outputs with a differential amplifier bridge circuit. When the coil moves off center, it will produce uneven heating across the bond line. This heating will result in a differential thermocouple output signal that we use as a control function to restore the coil to the center of the susceptor, and, thereby, restore uniform heating across the bond line. Nevertheless, there also remains problems with the accuracy of positioning in the assembly, with shorting, and with reproducibility in what currently is a task requiring relatively high skill.

A drawback to this multinode thermocouple method of process monitoring and control for induction welding is that it is intrusive because the thermocouple wires stay in the bond line. However, the diameter of the thermocouple wires can be as little as 0.001 inch and they should not present any structural problems. The insulation of the thermocouple wire should be the same thermoplastic resin as that being welded and should not have any adverse effect on the structural properties of the bond.

4. Dealing with Susceptor-Coil Misalignment

Figure 4:
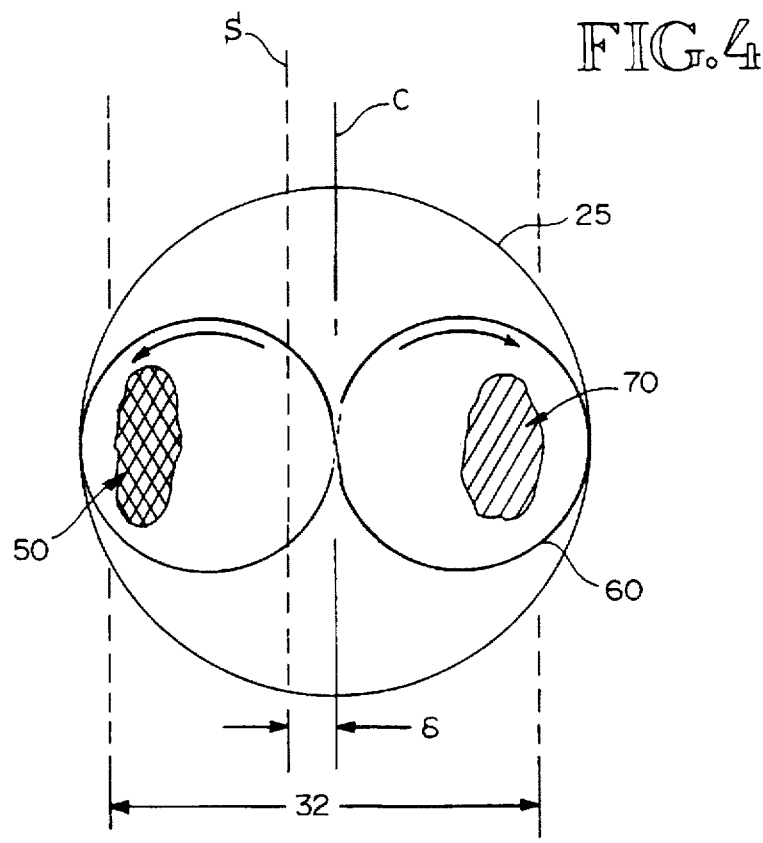
FIG. 4 is a schematic plan view of a "lazy 8" secondary compensating coil creating a parasitic hot spot because of coil-susceptor misalignment δ between the coil centerline C and the susceptor centerline S.

Knowing the temperature at the bond line is important information for producing reliable, quality welds reproducibly, but knowing the temperature is not sufficient. With induction heads like the cup coil of U.S. Pat. No. 5,313,037, the centerline null and high induced current near edges of the susceptor 32 requires tailoring the conductivity of the susceptor 32 to avoid nonuniform heating. The physics of heating and of the tailoring of the susceptor to achieve temperature uniformity relies upon accurate alignment of the coil over the susceptor. If the coil is displaced from the centerline by some increment δ, then the coil will create nonuniform heating (i.e. hot spots 50) on one side of the susceptor, as shown in FIG. 4. We can take either one of two compensatory actions when such misalignment occurs. First, we can sense the misalignment because of the change misalignment causes in the magnetic field and can use the sensed control signal to drive or to steer the head back into alignment. Second, we can alternatively use a parasitic coil 60 to create a compensating hot spot 70 on the otherwise cooler side of the susceptor and bond line to achieve a more uniform temperature distribution under the head.

With our earlier temperature monitoring systems, primarily we were limited to adjusting the coil power or the head speed in response to the measured temperature. With the dual multinode thermocouple arrangement, we could accurately measure temperature differences between the two sides of the susceptor to steer the coil to correct alignment, but we needed to introduce thermocouples to the laid up assembly to achieve monitoring control signals. The present invention, then, is a modified induction coil that monitors temperature differences without the need for embedded thermocouples and which either produces steering signals to correct misalignment or parasitically induces compensating heating in the otherwise cooler side of the susceptor. The signals or the parasitic compensation automatically scale in direct proportion to the misalignment as misalignment is measured in terms of the offset distance (i.e. "δ", FIG. 4) measured as the distance from the centerline S of the susceptor to the centerline (C) of the moving coil.

Figure 3:
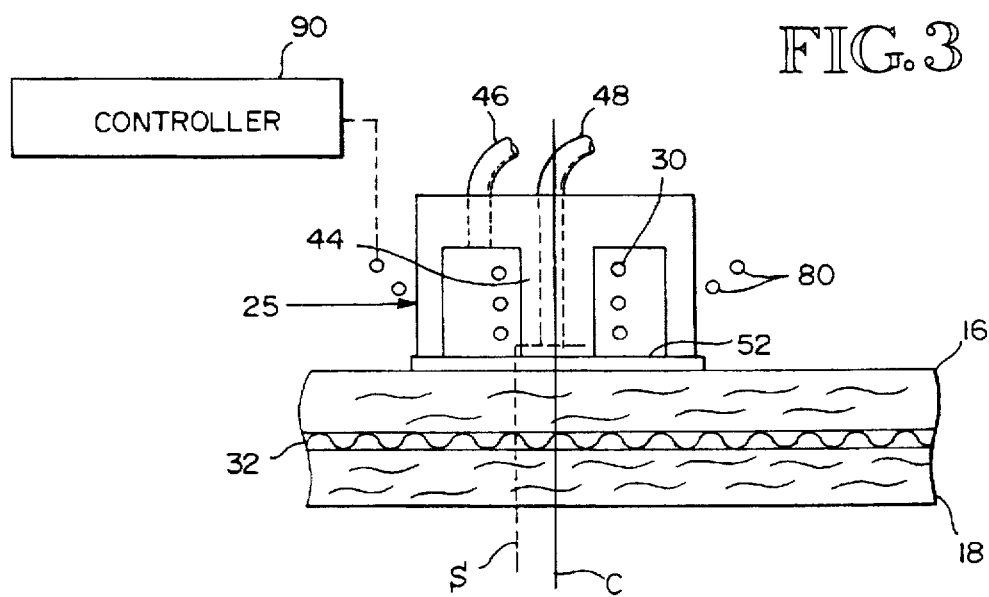
FIG. 3 is schematic sectional view of a cup coil misaligned over a susceptor by displacement of the coil centerline C from the susceptor centerline S where the coil includes peripheral coils to produce a steering signal to restore proper alignment.

As shown in FIGS. 2 & 3, the coil 25 includes a Litz wire winding 30 around the high magnetic permeability cup core 42 having a central pole 44. Active cooling is provided through ports 46 and 48 with the cooling fluid contained around the winding 30 with sealing faceplate 52. This coil produces a magnetic field and induces eddy currents in the susceptor 32 with a varying amplitude represented by the graph of current versus position in relation to the centerline (and aligned pole 44) generally as shown in FIG. 2. If the coil and susceptor are misaligned such that the centerline of the susceptor 32 and central pole 44 or centerline of the coil are offset by a distance δ, then the magnetic field will induce a hot spot 50 on the side of the susceptor with the displacement. That is, if the coil is displaced ¼ inch to the left off the centerline, the hot spot 50 will arise on the left side of the susceptor 32, as shown in FIG. 4.

Figure 5:
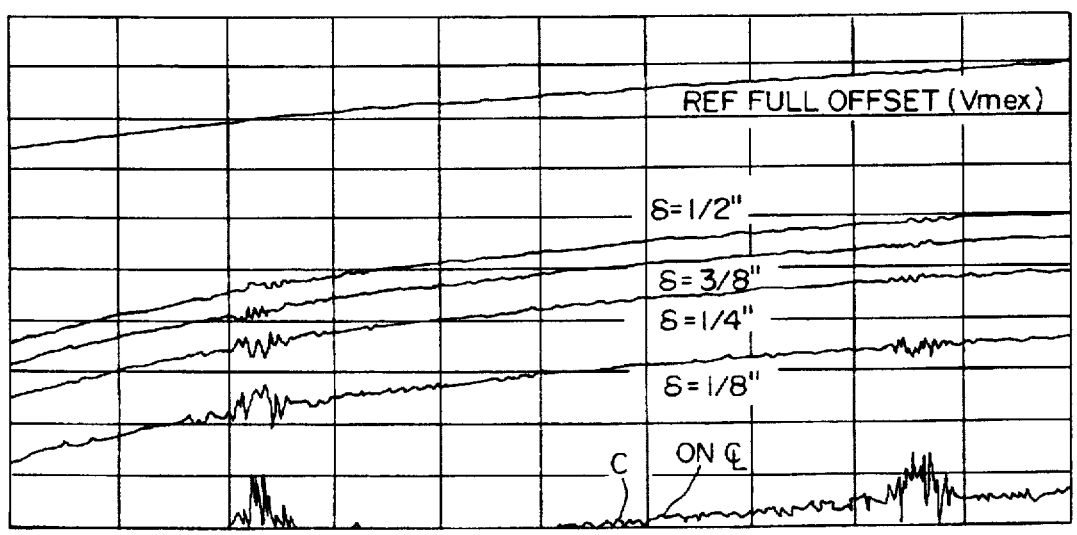
FIG. 5 is a graph showing the induced voltage in the "lazy 8" coil as a function of offset for increments of 0.125 inch from 0.125–0.5 inch misalignment.

With the coil 25 of U.S. Pat. No. 5,313,037, as shown in FIG. 3, we detect the misalignment of the coil and susceptor (i.e. δ) with the secondary coils 80 that are two peripheral coils connected in differential mode so that the output (a measure of the change in voltage) vanishes when coil 25 is centered over the susceptor. The secondary coils 80 are tipped at 45% to produce an error function of measured voltage change with a constant slope of about 30 mV/inch of offset (δ) from the centerline (FIG. 5). Voltage change is coupled to controller 90 which, in turn, adjusts the lateral position of head 10 on beam 12 As such, the error function becomes an adequate control signal to steer the coil 25 back into alignment by a suitable control circuit coupled the welding head 10 or to the coil 25 that the head 10 carries.

Active motive control adds complexity to the system, however, with electrical, electromechanical and mechanical subsystems to effect the desired translation of the coil in relationship to the detected misalignment. The compensating motion can correct the alignment, but hot spots still occur and thermal nonuniformities result. Therefore, alternately to the error function motion control system, the present invention also contemplates a passive secondary compensatory heater that is automatically activated by coil-susceptor misalignment. This alternate embodiment is shown schematically in FIGS. 4, 6A, and 6B. Here, instead of using tipped peripheral coils 80, we modify the induction head to carry a "lazy 8" coil 60 between the primary coil 30 and the susceptor 32. This "lazy 8" coil 60 might be fabricated into the faceplate 52 of the induction head or in an auxiliary plate connected adjacent to the faceplate.

Figure 6A:
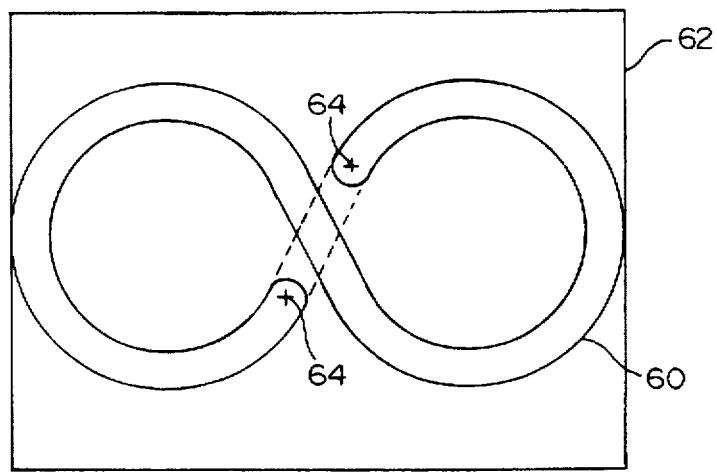
FIG. 6A & 6B illustrate top and bottom plan views of a circuit board embodiment of the preferred "lazy 8" coil.
Figure 6B:
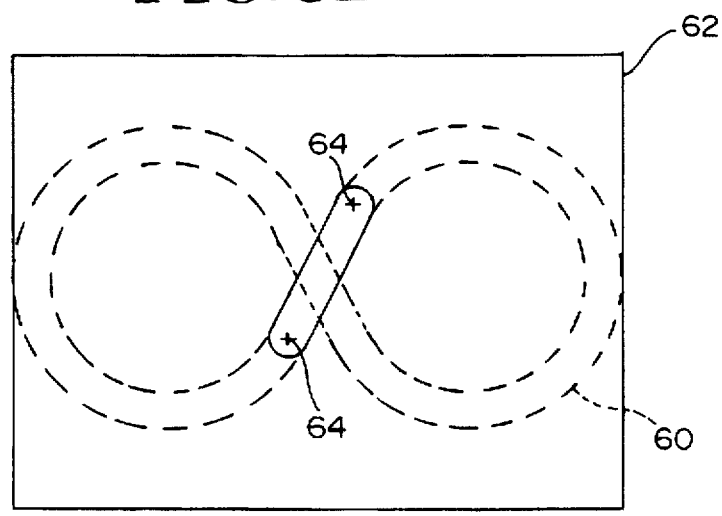

The "lazy 8" coil 60 is best illustrated in FIGS. 6A and 6B which are, respectively, a top plan view and bottom plan view. The coil 60 is a copper conductor printed on a dielectric circuit board substrate with through-holes 64 in two locations to complete the loop. The through-holes 64 are designated by the "X's" in FIGS. 6A and 6B and might be copper rivets soldered to the strips on the surfaces of the substrate. Of course, any other suitable method of connecting the frontside and backside of the board might be used. Also, the copper conductor might be submerged partially into vias cut into the substrate.

FIGS. 6A and 6B are schematic insofar as the substrate 62 is rectangular. Typically, it will be the same general size and shape as the faceplate of the induction coil.

We align the center of the "lazy 8" coil with the central pole 44 of the induction coil as shown in FIG. 4 with the "8" spanning across the susceptor when the coil and susceptor are aligned. In this arrangement, the "lazy 8" produces no measurable effect if the coil and susceptor are properly aligned. For an induction coil of our general type operating at about 300W and 30–50 kHz, the differential, parasitic secondary coil 60 will form a compensating hot spot 70 on the otherwise cool side of the susceptor when misalignment occurs. As shown graphically from empirical measurements, the parasitic current is a function of the offset in substantially as the magnitude of the hot spot increases in relation to the offset (δ). While the compensatory hot spot 70 arises automatically with the "lazy 8" parasitic secondary coil, the compensatory hot spot will not be as hot as the hot spot created with the coil because of the misalignment. Nevertheless, the "lazy 8" will produce a more uniform temperature across the susceptor than we attain without the "lazy 8," even if we detect misalignment and steer the coil back into alignment. To the extent that the weld quality is a function of having the bond line reach substantially the same temperature in all locations as the coil moves in the welding operation, then the "lazy 8" coil 60 provides our only means to compensate automatically (albeit imperfectly) for misalignment. Accordingly, we approach the ideal condition when a fault such as misalignment occurs so our welding operation is more robust.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it Accordingly, limit the claims only as necessary in view of the pertinent prior art.

I claim:

1. An induction coil having a self-steering system for moving the induction coil over a bond line in thermoplastic welding operations into alignment with a bond line susceptor, comprising:

(a) a core made from high magnetic permeability material and having at least one pole;

(b) a primary coil wound on the pole of the core;

(c) a secondary coil connected with the core for sensing misalignment between the coil and a susceptor at the bond line by detecting a change in the magnetic field arising from the misalignment, and (d) motive means for adjusting the position of the primary coil relative to the susceptor,
   wherein the secondary coil provides a steering signal to the motive means for moving the coil to restore alignment.

2. An induction coil having automatic, parasitic heating to compensate for misalignment of the coil with a susceptor on a bond line of a thermoplastic weld, comprising:

(a) a core made from high magnetic permeability material and having at least one pole;

(b) a primary coil wound on the pole of the core;

(c) a secondary coil aligned with the pole and positioned between the primary coil and the susceptor, the secondary coil being generally a "lazy-8" conductor arranged to create parasitically a compensatory hot spot on the otherwise cool side of the susceptor when an energized primary coil is misaligned with the susceptor.

3. An induction coil for thermoplastic welding involving inducing eddy currents in a susceptor along a bond line where resin fuses, comprising:

(a) a core made from high magnetic permeability material and having at least one pole;

(b) a primary coil wound on the pole;

(c) a secondary coil associated with the core and primary coil to sense misalignment between the primary coil and susceptor and to provide compensation for the misalignment to restore alignment or to provide more uniform heating in the bond line.

* * * * *